United States Patent
Ijaz et al.

(10) Patent No.: US 9,954,605 B2
(45) Date of Patent: Apr. 24, 2018

(54) TELECOMMUNICATIONS APPARATUS AND METHODS

(71) Applicant: SONY CORPORATION, Tokyo (JP)

(72) Inventors: Ayesha Ijaz, Weybridge (GB); Muhammad Ali Imran, Weybridge (GB); Atta Ul Quddus, Weybridge (GB); Yinan Qi, Weybridge (GB); Hideji Wakabayashi, Basingstoke (GB); Jussi Tapani Kahtava, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/321,661

(22) PCT Filed: Jul. 2, 2015

(86) PCT No.: PCT/EP2015/065117
§ 371 (c)(1),
(2) Date: Dec. 22, 2016

(87) PCT Pub. No.: WO2016/005267
PCT Pub. Date: Jan. 14, 2016

(65) Prior Publication Data
US 2017/0244474 A1 Aug. 24, 2017

(30) Foreign Application Priority Data

Jul. 10, 2014 (EP) .................................. 14176603

(51) Int. Cl.
*H04W 52/42* (2009.01)
*H04B 7/26* (2006.01)
(Continued)

(52) U.S. Cl.
CPC ....... *H04B 7/2606* (2013.01); *H04B 7/15507* (2013.01); *H04W 52/42* (2013.01); *H04W 88/04* (2013.01); *H04W 88/06* (2013.01)

(58) Field of Classification Search
CPC ......................... H04B 7/15507; H04W 52/42
(Continued)

(56) References Cited

U.S. PATENT DOCUMENTS

2004/0044649 A1\* 3/2004 Yamato ............... G06F 11/1456
2013/0195016 A1\* 8/2013 Jamadagni ........... H04W 4/005
370/328

(Continued)

OTHER PUBLICATIONS

"Digital cellular telecommunications system (Phase 2+); Universal Mobile Telecommunications System (UMTS); LTE; Service requirements for Machine-Type Communications (MTC); Stage 1," 3GPP TS 22.368 version 11.6.0 Release 11, Sep. 2012, 21 pages.

(Continued)

*Primary Examiner* — John J Lee
(74) *Attorney, Agent, or Firm* — Oblon, McClelland, Maier & Neustadt, L.L.P.

(57) ABSTRACT

A method of operating a relay device to receive data from one or more terminal devices and relay the data to a base station in a wireless telecommunications system. The method includes receiving plural blocks of data from one or more terminal devices at different times. Each block of data is received in association with an indication of a time by which the block of data should be transmitted to the base station. The block of data are buffered at the relay node that determines earliest time by which one of the received blocks of data should be transmitted to the base station and transmits the plurality of blocks of data to the base station together in advance of this earliest time. The method reduces signalling overhead associated with transmissions from the (Continued)

relay device to the base station while helping to ensure data is not delayed at the relay node for longer than is acceptable for the data.

21 Claims, 3 Drawing Sheets

(51) Int. Cl.
*H04W 88/04* (2009.01)
*H04W 88/06* (2009.01)
*H04B 7/155* (2006.01)

(58) Field of Classification Search
USPC .................. 455/7, 11.1, 452.1, 509, 67.11
See application file for complete search history.

(56) References Cited

U.S. PATENT DOCUMENTS

| | | | |
|---|---|---|---|
| 2014/0126497 A1* | 5/2014 | Xu ...................... | H04W 74/002 370/329 |
| 2014/0161024 A1* | 6/2014 | Speight ............. | H04W 74/0833 370/315 |
| 2014/0226558 A1 | 6/2014 | Speight et al. | |

OTHER PUBLICATIONS

O. Teyeb, et al., "User multiplexing in relay enhanced LTE-advanced networks," IEEE 71st Vehicular Technology Conference (VTC 2010-Spring), 2010, 2 pages (abstract only).
S. N. K. Marwat, et al., "A Novel Machine-to-Machine Traffic Multiplexing in LTE-A System using Wireless In-band Relaying," Mobile Networks and Management, 2013, 10 pages.
H. Holma, et al., "LTE for UMTS OFDMA and SC-FDMA based radio access," 2009, 4 pages.
Y. Yang, et al., "Relay Technologies for WiMAX and LTE-Advanced Mobile Systems," IEEE Communications Magazine, Oct. 2009, pp. 100-105.
K. Loa, et al., "IMT-Advanced Relay Standards," IEEE Communications Magazine, Aug. 2010, pp. 40-48.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.0.0, 2010, 104 pages.
"System Design Frameworks to Support Type II Relay Operation in LTE-A," 3GPP TSG RAN WG1 #58, R1-093355, Aug. 24-28, 2009, 11 pages.
"Challenges with Type II Relay Operation," 3GPP TSG-RAN WG1 #58, R1-0931 13, Aug. 24-28, 2009, 3 pages.
"Type 2 Relay Summary," 3GPP TSG RAN WG1 Meeting #60, R1-100951, Feb. 18-22, 2010, 3 pages.
M. Iwamura, et al., "Relay Technology in LTE-Advanced," NTT DOCOMO Technical Journal, vol. 12, No. 2, 2010, pp. 29-36.
A. Li, et al., "A novel type II relay-assisted retransmission scheme for uplink of LTE-advanced system," EURASIP Journal on Advances in Signal Processing, vol. 2013, No. 1, 2013, 2 pages. (Summary only).
S. Sesia, et al., "LTE—The UTMS Long Term Evolution: From Theory to Practice," Second Edition, J. Wiley & Sons, Ltd., 2011, 3 pages (Summary only).
"Updated SID on: Provision of low-cost MTC UEs based on LTE," TSG RAN meeting #57, RP-121441, Sep. 4-7, 2012, 6 pages.
"3rd Generation Partnership Project; Technical Specification Group Radio Access Network; Evolved Universal Terrestrial Radio Access (E-UTRA); LTE coverage enhancements (Release 11)," 3GPP TR 36.824 V11.0.0, Jun. 2012, 18 pages.
"General considerations on coverage enhancements for MTC," 3GPP TSG-RAN WG1 Meeting #71, R1-124887, Nov. 12-16, 2012, 6 pages.
"Coverage improvement techniques for low cost MTC UEs," 3GPP TSG RAN WG1 #71, R1-125039, Nov. 12-16, 2012, 10 pages.
"Text Proposal on Coverage Enhancement for a MTC UE," 3GPP TSG RAN WG1 #72, R1-130264, Jan. 28-Feb. 1, 2013, 7 pages.
"Coverage Extension for MTC UEs," 3GPP TSG-RAN1#71, R1-125204, Nov. 12-16, 2012, 7 pages.
"PDSCH coverage extension for low-cost MTC UEs by power-density boosting," 3GPP TSG RAN WG1 #72bis, R1-130959, Apr. 15-19, 2013, 8 pages.
"PDCCH coverage extension for low-cost MTC UEs by power-density boosting," 3GPP TSG RAN WG1 #72bis, R1-130960, Apr. 15-19, 2013, 7 pages.
"PBCH Coverage extension for low-cost MTC UEs by power-density boosting," 3GPP TSG RAN WG1 #72bis, R1-130958, Apr. 15-19, 2013, 6 pages.
"3rd Generation Partnership Project; Technical Specification Group Radio Access Network; Study on provision of low-cost Machine-Type Communications (MTC) User Equipments (UEs) based on LTE (Release 12)," 3GPP TR 36.888 V12.0.0, Jun. 2013, 55 pages.
E. Dahlman, et al., "4G LTE/LTE-Advanced for Mobile Broadband," 2011, 7 pages (Summary of chapters only).
International Search Report dated Sep. 23, 2015 in PCT/EP2015/065117 filed Jul. 2, 2015.

* cited by examiner

TELECOMMUNICATIONS APPARATUS AND METHODS

CROSS-REFERENCE TO RELATED APPLICATIONS

The present application is based on PCT filing PCT/EP2015/065117 filed Jul. 2, 2015, and claims priority to European Patent Application 14 176 603.0, filed in the European Patent Office on Jul. 10, 2014, the entire contents of each of which is being incorporated herein by reference.

BACKGROUND

Field

The present disclosure relates to telecommunications apparatus and methods. In particular certain examples of the disclosure relate to telecommunications apparatus and methods using relay nodes to relay data from terminal devices to network infrastructure equipment, such as a base station.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile communication systems have evolved from the GSM System (Global System for Mobile communications) to the 3G system and now include packet data communications as well as circuit switched communications. The third generation partnership project (3GPP) has developed a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

To help improve the performance and flexibility of wireless ("mobile") communications systems, relay nodes/devices can supplement transmissions associated with base stations. In particular relay nodes may be used to enhance coverage, either by extending coverage to new geographic areas or by enhancing the coverage at locations in an existing cell.

A relay node maybe considered as being distinct from a conventional cellular base station (e.g. a so-called eNodeB (eNB) in 3GPP LTE nomenclature) in the sense that a relay node may be wirelessly connected to the RAN (radio access network) through a conventional base station. The base station through which a relay node connects to the RAN is often referred to as a donor base station/donor eNB (i.e. the term donor base station may be used to refer to a base station serving a relay node). The radio network cell supported by the donor eNB in which the relay node is located may similarly be referred a donor cell for the relay node.

In a 3GPP context, there are two main types of relay node, namely Type-I relays and Type-II relays. Type-I relays are a kind of non-transparent relay with wireless backhaul to the donor eNodeB cell. A Type-I relay has its own cell and physical cell identification (ID), terminates layers 2 and 3 protocols, and appears to a terminal device as a conventional base station. Therefore a Type-I relay, which transmits synchronization signals and performs resource allocation, can help to support a remote terminal device that is out of normal coverage of a base station, thereby extending the signal and service coverage. Type-I relays can operate in either an inband manner (with base station to relay node communications on the same carrier frequency as the relay node to terminal device communications) or an outband manner (with base station to relay node communications not on the same carrier frequency as the relay node to terminal device communications). A Type-II relay, on the other hand, does not have its own cell ID and the terminal device is not aware of whether or not it is communicating with the base station via the relay node (i.e. type-II relays are a kind of transparent relay). Type-II relay nodes support only inband operation.

Relay nodes may be distinguished from wireless repeaters. The function of a wireless repeater is simply to boost the power of the signals it receives. Wireless repeaters do not discriminate between wanted signal, interference or noise, and will re-broadcast all signal components received. Relay nodes, on the other hand, are regenerative repeaters in the sense that they decode a received signal and selectively re-broadcast appropriate components. Relay nodes can therefore provide for improved signal-to-noise ratios (SNRs), provided a signal is received at the relay node with a sufficient SNR to allow the relay node to decode it successfully.

One particular area in which relay nodes may be expected to be relevant is in the support of so-called machine type communication (MTC) applications. MTC applications are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on. Smart metering is merely one example MTC application and there are many other situations in which MTC-type devices might be used, for example for traffic surveillance, e-healthcare and general monitoring applications. In general, MTC devices may be useful whenever there is a desire for devices to communicate wirelessly with some degree of autonomously (i.e. without human invention). Some typical characteristics of MTC type terminal devices/MTC type data might include, for example, characteristics such as low mobility, high delay tolerance, small data transmissions, infrequent transmission and group-based features, policing and addressing. Further information on characteristics of MTC-type devices can be found, for example, in the corresponding standards, such as ETSI TS 122 368 V11.6.0 (September 2012)/3GPP TS 22.368 version 11.6.0 Release 11) [1].

It can be expected that some types of terminal device, such as MTC type terminal devices, may in particular benefit from relay node support. For example, it can be expected that MTC devices will be relatively low-cost devices and might need to rely on battery power for extended periods. As such, it would be a benefit for such terminal devices to communicate with a base station via a nearer relay node to reduce the uplink transmission power required. Also, it can be expected that certain types of terminal devices, such as smart meter type devices, may be in locations with relatively high penetration loss (for example in the basement of a building). To address these issues there have been proposed schemes for coverage enhancement, for example based around power boosting of base station transmissions. However, to help address this issue on the uplink side, it may be expected that relay nodes will play an important role in coverage extension for certain types of terminal device, such as MTC type terminal devices.

Accordingly, there is a need for schemes for efficient handling of communications, for example in terms of reducing overall signalling overhead, in wireless telecommunications systems using relay nodes/devices to support communications between terminal devices and base stations.

There have been proposed schemes for multiplexing data from different users at a relay node to seek to improve resource utilization, such as by Teyeb, Oumer, et al. in "User multiplexing in relay enhanced LTE-advanced networks", Vehicular Technology Conference (VTC 2010-Spring), 2010 IEEE 71st. IEEE, 2010 [2] and by Marwat, Safdar Nawaz Khan, et al. in "A Novel Machine-to-Machine Traffic Multiplexing in LTE-A System using Wireless In-band Relaying." Mobile Networks and Management, Springer International Publishing, 2013. 149-158 [3], but these do not provide completely satisfactory solutions to at least some of the issues that can arise.

SUMMARY

According to an aspect of the disclosure there is provided a method of operating a relay device to receive data from one or more terminal devices and relay the data to network infrastructure equipment in a wireless telecommunications system, the method comprising: receiving a plurality of blocks of data from one or more terminal devices at different times, wherein each block of data is received in association with an indication of a time by which the block of data should be transmitted to the network infrastructure equipment; storing the plurality of blocks of data at the relay device; determining the earliest time by which one of the received blocks of data should be transmitted to the network infrastructure equipment; and transmitting the plurality of blocks of data to the network infrastructure equipment together in advance of the determined earliest time by which one of the received blocks of data should be transmitted to the network infrastructure equipment.

According to an aspect of the disclosure there is provided a relay device for receiving data from one or more terminal devices and relaying the data to network infrastructure equipment in a wireless telecommunications system, wherein the relay device comprises a controller unit, a transceiver unit and a storage unit configured to operate together to: receive a plurality of blocks of data from one or more terminal devices at different times, wherein each block of data is received in association with an indication of a time by which the block of data should be transmitted to the network infrastructure equipment; store the plurality of blocks of data in the storage unit; determine the earliest time by which one of the received blocks of data should be transmitted to the network infrastructure equipment; and transmit the plurality of blocks of data to the network infrastructure equipment together in advance of the earliest time by which one of the received blocks of data should be transmitted to the network infrastructure equipment.

According to an aspect of the disclosure there is provided circuitry for a relay device for receiving data from one or more terminal devices and relaying the data to network infrastructure equipment in a wireless telecommunications system, wherein the circuitry comprises a controller element and a transceiver element configured to operate together to: receive a plurality of blocks of data from one or more terminal devices at different times, wherein each block of data is received in association with an indication of a time by which the block of data should be transmitted to the network infrastructure equipment; store the plurality of blocks of data in a storage unit; determine the earliest time by which one of the received blocks of data should be transmitted to the network infrastructure equipment; and transmit the plurality of blocks of data to the network infrastructure equipment together in advance of the earliest time by which one of the received blocks of data should be transmitted to the network infrastructure equipment.

According to an aspect of the disclosure there is provided a method of operating a terminal device in a wireless telecommunications system in which a relay device is used to relay data from the terminal device to network infrastructure equipment, the method comprising: generating a block of data to be transmitted to the network infrastructure equipment via the relay device; establishing an indication of a time by which the block of data should be transmitted to the network infrastructure equipment; and transmitting the block of data to the relay device in association with the indication of the time by which the block of data should be transmitted to the network infrastructure equipment.

According to an aspect of the disclosure there is provided a terminal device for use in a wireless telecommunications system in which a relay device is used to relay data from the terminal device to network infrastructure equipment, wherein the terminal device comprises a controller unit and a transceiver unit configured to operate together to: generate a block of data to be transmitted to the network infrastructure equipment via the relay device; establish an indication of a time by which the block of data should be transmitted to the network infrastructure equipment; and transmit the block of data to the relay device in association with the indication of the time by which the block of data should be transmitted to the network infrastructure equipment.

According to an aspect of the disclosure there is provided circuitry for a terminal device for use in a wireless telecommunications system in which a relay device is used to relay data from the terminal device to network infrastructure equipment, wherein the circuitry comprises a controller element and a transceiver element configured to operate together to: generate a block of data to be transmitted to the network infrastructure equipment via the relay device; establish an indication of a time by which the block of data should be transmitted to the network infrastructure equipment; and transmit the block of data to the relay device in association with the indication of the time by which the block of data should be transmitted to the network infrastructure equipment.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
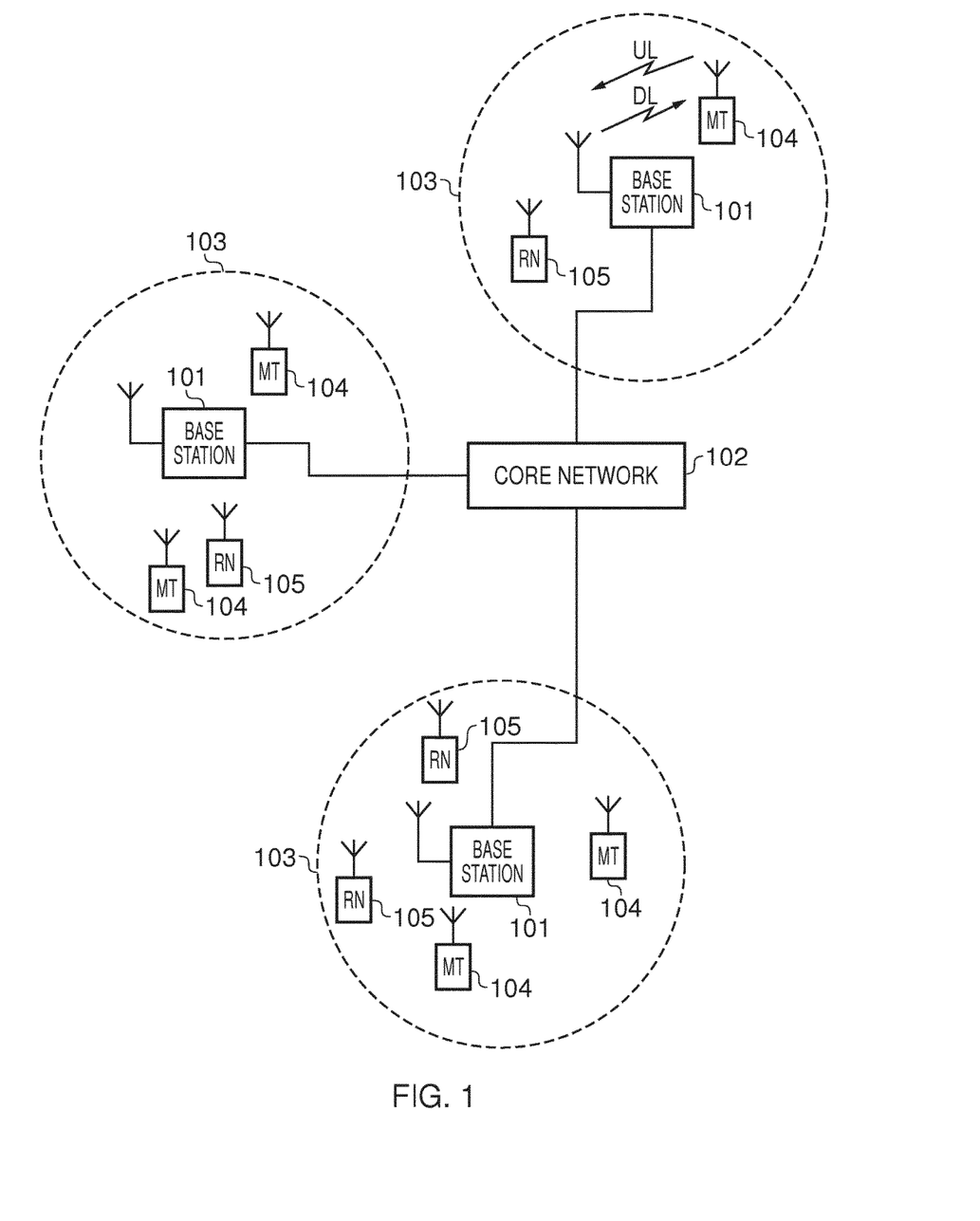
FIG. 1 is a schematic diagram illustrating some general aspects of mobile telecommunications networks/systems.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma, H. and Toskala, A. [4]. It will be appreciated that operational aspects of the telecommunications network which are not specifically described below may be implemented in accordance with any known techniques, for example according to the relevant standards and known variations thereof.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network 100. The core network 102 routes data to and from the terminal devices 104 via the respective base stations 101 and provides functions such as authentication, mobility management, charging and so on. In addition to the base stations 101 and terminal devices 104, the system 100 further comprises one or more relay nodes/devices 105. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, and so forth. Similarly, base stations may also be referred to as transceiver stations/nodeBs/e-nodeBs, and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Figure 2:
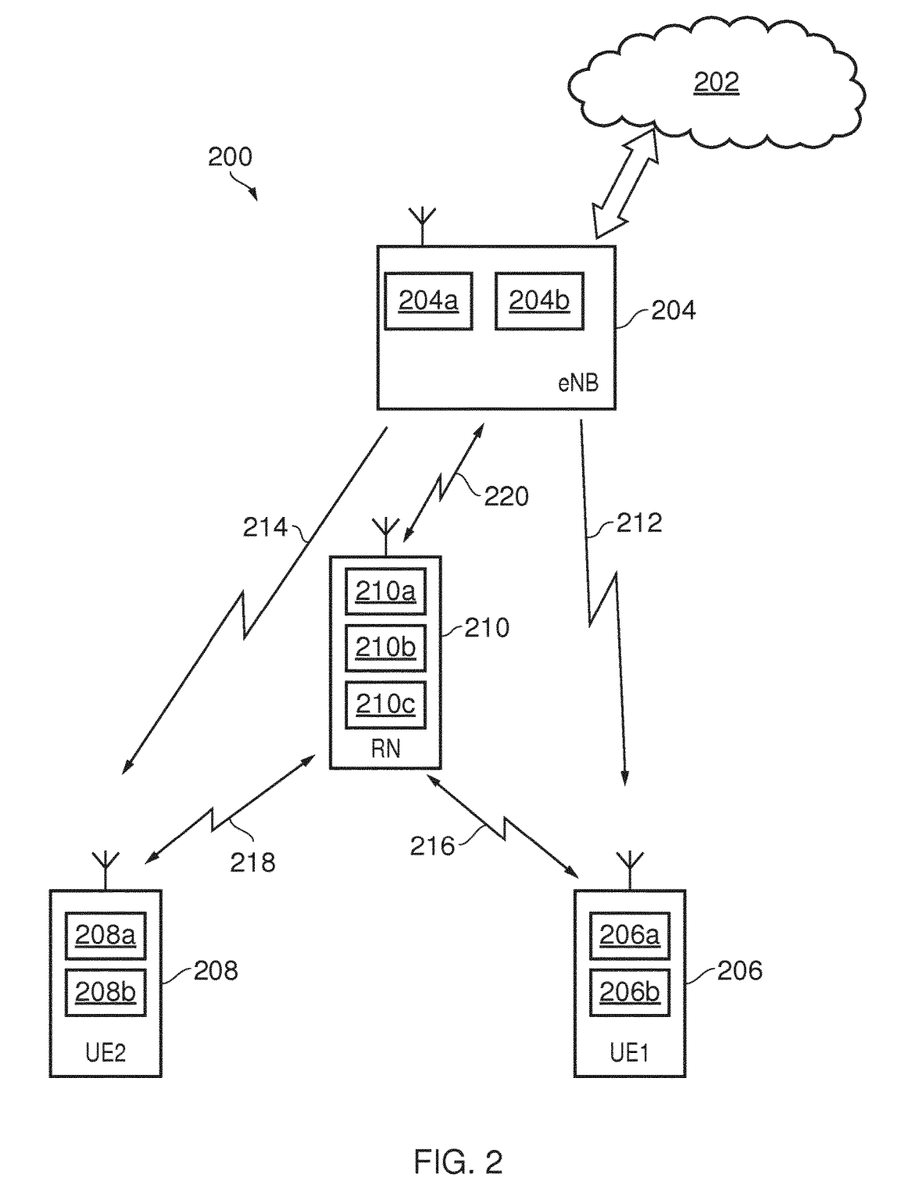
FIG. 2 is a schematic diagram illustrating an example of some aspects of a mobile telecommunication system in accordance with certain embodiments of the disclosure.

FIG. 2 schematically shows a telecommunications system 200 according to an embodiment of the disclosure. The telecommunications system 200 in this example is based broadly on a LTE-type architecture. As such many aspects of the operation of the telecommunications system 200 are standard and well understood and not described here in detail in the interest of brevity. Operational aspects of the telecommunications system 200 which are not specifically described herein may be implemented in accordance with any known techniques, for example according to the established LTE-standards and known variations thereof.

The telecommunications system 200 comprises a core network part (evolved packet core) 202 coupled to a radio network part. The radio network part comprises a base station (evolved-nodeB, eNb) 204, a first terminal device (UE1) 206, a second terminal device (UE2) 208 and a relay node/device (RN) 210. It is assumed for the sake of a concrete example that the terminal devices 206, 208 are machine-type communications (MTC) devices associated with smart meters and are located in the basement of a building, and the relay device is located at ground level in, or in the vicinity of, the building. It will of course be appreciated that in practice the radio network part may comprise a plurality of base stations serving a larger number of terminal devices across various communication cells using a plurality of relay nodes/devices. However, only a single base station and relay device and two terminal devices are shown in FIG. 2 in the interests of simplicity.

As with a conventional mobile radio network, the terminal devices 206, 208 are arranged to wirelessly communicate data to and from the base station (transceiver station) 204 and may rely on the relay device 210 to help support aspects of these communication. In this example the relay node is used asymmetrically in that downlink communications are assumed to go directly from the base station 204 to the terminal devices 206, 208 (schematically indicated by signal arrows 212, 214), while uplink communications are assumed to go from the terminal devices 206, 208 to the base station 204 via the relay device 210 (schematically indicated by signal arrows 216, 218, 220). This asymmetric use of relay nodes may be expected to be prevalent in certain situations, for example where there are restrictions on the uplink power available to terminal devices. For example, a terminal device's uplink power may be limited to preserve its battery power, or the terminal device may simply be in a location where it is unable to transmit with sufficient power for its communications to reliably reach a base station directly. For example, a terminal device may be located in a basement of a building, and the relay node may be provided in relatively close proximity to the terminal device, but at or above ground level (or perhaps below ground level but with a more powerful transmitter). In these cases the relay node may not be required for downlink communications because the base station can transmit signalling with sufficient power to reach the terminal device directly, either using conventional techniques or using established coverage enhancement techniques.

The base station 204 is communicatively connected to a serving gateway, S-GW, (not shown) in the core network part which is arranged to perform routing and management of mobile communications services to the terminal devices in the telecommunications system 200 via the base station 204 in accordance with generally conventional techniques. In order to maintain mobility management and connectivity, the core network part 202 also includes a mobility management entity (not shown) which manages the enhanced packet service, EPS, connections with the terminal devices 206, 208 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 2 may be broadly conventional apart from where modified to provide functionality in accordance with embodiments of the disclosure as discussed herein.

The terminal devices 206, 208 each comprise a transceiver unit 206a, 208a for transmission and reception of wireless signals and a controller unit 206b, 208b configured to control the operation of the respective devices 206, 208 in accordance with embodiments of the disclosure. The respective controller units 206b, 208b may each comprise a processor unit which is suitably configured/programmed to provide the desired functionality described herein using conventional programming/configuration techniques for equipment in wireless telecommunications systems. For each of the terminal devices 206, 208, their respective transceiver units 206a, 208a and controller units 206b, 208b are schematically shown in FIG. 2 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 206, 208 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 206a, 208a of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 206a, 208a of the terminal devices 206, 208 represented in FIG. 2 are assumed here to provide the functionality of an LTE transceiver module, a Wi-Fi transceiver module and a Bluetooth transceiver module in accordance with conventional wireless communications techniques.

The base station 204 comprises a transceiver unit 204a for transmission and reception of wireless signals and a controller unit 204b configured to control the base station 204. The controller unit 204b may comprise a processor unit which is suitably configured/programmed to provide the desired functionality described herein using conventional programming/configuration techniques for equipment in wireless telecommunications systems. The transceiver unit 204a and the controller unit 204b are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 204 will in general comprise various other elements associated with its operating functionality. For example, the base station 204 will in general comprise a scheduling entity responsible for scheduling communications. The functionality of the scheduling entity may, for example, be subsumed by the controller unit 204b.

The relay device 210 comprises a transceiver unit 210a for transmission and reception of wireless signals, a controller unit 210b configured to control the relay device 210, and a storage unit/buffer 210c for storing data received from terminal devices 206, 208 before it is relayed to the base station 204. The controller unit 210b may comprise a processor unit which is suitably configured/programmed to provide the desired functionality described herein using conventional programming/configuration techniques for equipment in wireless telecommunications systems. As for the terminal devices 206, 208, the relay node 210 also support multiple radio access technologies, such Wi-Fi and Bluetooth functionality in addition to cellular/mobile telecommunications functionality. Thus the transceiver unit 210a of the relay device 210 may comprise functional modules operable according to different wireless communications operating standards (radio access technologies). For example, the relay device's transceiver unit may comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may again be provided in accordance with conventional techniques. The transceiver unit 210a, controller unit 210b and buffer 210c are schematically shown in FIG. 2 as separate elements for ease of representation. However, it will be appreciated that the functionality of these units can be provided in various different ways, for example using a single suitably programmed general purpose computer with associated memory, or suitably configured application-specific integrated circuit(s)/circuitry or using a plurality of discrete circuitry/processing elements for providing different elements of the desired functionality. It will be appreciated the relay device 210 will in general comprise various other elements associated with its operating functionality. As with the other elements represented in FIG. 2 and the other figures, the operation of the relay device 210 may be based on conventional techniques except where modified in accordance with the principles described herein.

The relay device 210 may be a dedicated relay apparatus. However, it has also been proposed that relay node functionality may be provided as an additional function of a suitably configured terminal device operating in a wireless telecommunications system, and it is assumed for the example implementation of FIG. 2 that this is the case. That is to say, the relay device 210 represented in FIG. 2 in this particular example implementation comprises another terminal device operating in the wireless telecommunications system 200 which is configured to operate as a relay node (for example by running a relay node application to cause the terminal device to provide relay node functionality in accordance with the approaches described herein). In this regard, the relay node functionality in the wireless telecommunications system 200 may be provided, at least in part, on an ad hoc basis with one or more terminal devices in uplink and downlink communication with a base station acting as a relay device to assist other terminal devices with their uplink communications in accordance with the previously proposed principles. Nonetheless, in other example implementations, the relay device 210 may comprise a dedicated relay node apparatus which is again operating in accordance with conventional techniques apart from where modified to provide functionality in accordance with the principles described herein.

Thus, the base station 204 is configured to communicate data with the first and second terminal devices 206, 208 in downlink over respective radio communication links/interfaces 212, 214. These radio links 212, 214 may be based on a cellular telecommunications operating standard, for example, an LTE-based operating standard (i.e. making use of the LTE transceiver modules of the terminal devices 206, 208). The relay device 210 is configured to communicate data with the base station 204 in uplink and downlink over radio communication link/interface 220. This radio link 220 may be based on the same cellular telecommunications operating standard as the radio downlinks 212, 214 from the base station 204 to the terminal devices 206, 208, for example, an LTE-based operating standard. The terminal devices 206, 208 are configured to communicate data with the relay device 210 in uplink over respective radio communication links/interfaces 216, 218. These radio links 216, 218 may be based on a cellular telecommunications operating standard or a non-cellular telecommunications operating standard, for example, a wireless local area network, WLAN, operating standard, such as Wi-Fi, or other wireless communications technology, such as Bluetooth. In the example implementation of FIG. 2 in which the relay device 210 is provided by a suitably configured terminal device, the radio links 216, 218 between the terminal devices 206, 208 and the relay device 210 are assumed to operate in accordance with a Wi-Fi operating standard (i.e. making use of the Wi-Fi transceiver modules of the respective devices). With relay device functionality provided by a terminal device (as opposed to a dedicated relay node apparatus) it can be simpler if communications to be relayed are received in accordance with a non-cellular telecommunications operating standard. This is because in general a terminal device transceiver will not readily be configurable to receive uplink cellular communications. That is to say it will generally be simpler for a terminal device providing relay node functionality to receive communications over Wi-Fi (as many terminal devices now include Wi-Fi transceiver models as standard) rather than seek to emulate certain aspects of base station functionality that would be required to receive uplink cellular telecommunications signalling.

Modes of operation for the wireless telecommunications network 200 represented in FIG. 2 in accordance with certain embodiments of the disclosure will now be described. The general scenario for these embodiments is, as described above, assumed to be one in which the relay device 210 is supporting uplink communications from the MTC-type terminal devices 206, 208 to the base station 204. In this regard the uplink communications from the MTC-type terminal devices may be expected to typically comprise relatively small amounts of data which are not time critical. That is to say, the data to be communicated from the respective ones of the terminal devices 206, 208 to the base station 204 via the relay node 210 may often be delay tolerant data. For example, in a situation in which the terminal devices 206, 208 are associated with the smart meter functionality, they may be required to uplink daily usage data to an MTC server via the wireless telecommunications system 200, but the exact time at which the MTC server receives the daily usage data may not be very significant. For example, the MTC server may simply require the data for one day is received some time before midnight on the following day. Thus, if a terminal device transmits its data to the relay device 210 before this time, there is no need for the relay node to immediately forward the data to the base station 204. In this regard, the data that is delay tolerant may sometimes be referred to as non-real time data (i.e. data that does not need to be transmitted to the base station 204 in real-time). On the other hand, data that is not delay tolerant may sometimes be referred to as real-time data (i.e. data that should be transmitted to the base station to 204 as soon as possible). It will be recognised that approaches of the kind described herein in accordance with embodiments of the disclosure may be applied in respect of all kinds of delay-tolerant/non-real time data and the exact nature of the data and what it represents are not significant. That is to say, it is not significant to the principles underlying certain embodiment of the disclosure that the terminal devices 206, 208 in the example of FIG. 2 comprises smart meters reporting usage data.

Figure 3:
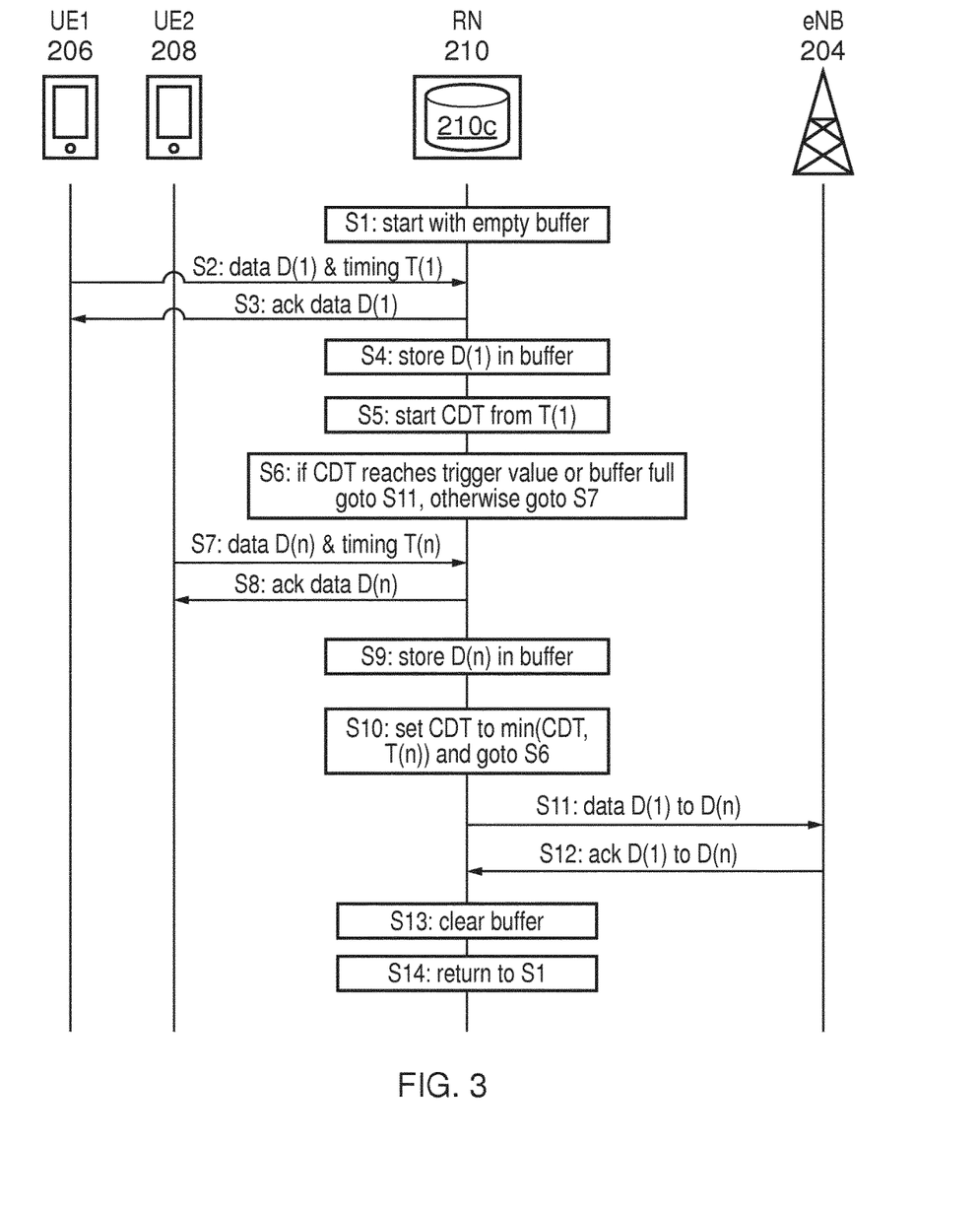
FIG. 3 is a schematic signalling ladder diagram illustrating an example of some aspects of methods of operation in a mobile telecommunication system in accordance with certain embodiments of the disclosure.

FIG. 3 is a signalling ladder diagram schematically representing modes of operation for the terminal devices (UE1, UE2) 206, 208, the relay device (RN) 210, and the base station (eNB) 204 schematically represented in FIG. 2 in accordance with certain embodiments of the present disclosure. The operation is for communicating a plurality of blocks of data, such as packets or groups of packets of data, from one or more of the terminal devices operating in the wireless telecommunications system to the base station via the relay device. In broad summary, some embodiments of the disclosure introduce the concept of terminal devices informing the relay device of timing requirements regarding their uplink transmissions (e.g. by transmitting data in association with an indication of a time by which the data should be transmitted to/received at the base station or other network element). The relay device may be configured to buffer a plurality of blocks of data received at different times (from the same and/or different terminal devices) whilst tracking the earliest of the times at which the respective blocks of data should be transmitted to the base station. The relay device may then be configured to transmit the plurality blocks of data stored in the buffer together in advance of (e.g. just before) the earliest time for which one of the blocks of data should be received by the base station. This approach can help reduce the overall signalling overhead as compared to existing relay techniques since the relay device may transmit a plurality of blocks of data (which individually may be relatively small) together, while at the same time helping to ensure that none of the blocks of data are delayed beyond the time by which they should be transmitted to the base station.

Some aspects of the operation represented in FIG. 3 are performed in a generally iterative/repeating manner as discussed further below. Processing in accordance with certain embodiments of the disclosure as schematically represented in FIG. 3 is shown starting from a stage at which the various devices are operating normally with the relay device 210 currently having no data in its buffer 210c requiring transmission to the base station 204 (e.g. because it has just been emptied in accordance with a previous iteration through the processing of FIG. 3).

Thus, the processing represented in FIG. 3 is schematically shown as starting at step S1 with the relay device having an empty buffer.

In step S2 it is assumed that one of the terminal devices operating in the wireless telecommunications system transmits data to be relay node 210 for onward transmission to the base station 204. The block of data may come from any of the terminal devices communicating with the base station 204 via the relay node 210, but in this example is assumed to come from terminal device (UE1) 206, as schematically indicated by the signalling arrow associated with step S2 in FIG. 3. The exact nature of the data and why it needs to be transmitted to the base station is not significant and will depend on the specific implementation at hand. For example, in a smart meter context, the data may be a usage report which is transmitted at a regular time each day to a remote MTC server via the wireless telecommunications system, for example to allow the remote MTC server to generate appropriate user billing information.

A significant aspect of step S2 which differs from existing techniques is that in addition to transmitting the block of data D(1) which the terminal device 206 would like the relay device 210 to forward to the base station 204, the terminal device 206 also transmits an indication of a latest time T(1) by which the block of data should ideally be transmitted to the base station. There are various ways in which this indication may be provided. For example, the indication may comprise an indication of an absolute (as opposed to relative) time (and potentially date) by which the data should be transmitted to the base station—for example indicating the data should be transmitted to the base station before midnight on the day it is received by the relay device. In another example, the indication may comprise an indication of a delay that may be tolerated before the data should be transmitted to the base station—for example indicating the data should be transmitted to the base station within six hours of it being received by the relay device. The exact manner in which the indication is provided is not significant. In some cases the indication may comprise an actual timing (either in terms of an absolute time or a relative time (delay)). In other cases the indication may comprise an index associated with a particular timing. For example, the block of data may be associated with a numeric index from which a time by which the data should be transmitted to the base station can be established by the relay device by reference to a lookup table setting out the acceptable delay for each of the different indices. Thus data for transmission in the wireless telecommunications system in accordance with certain embodiments of the disclosure may be classified according to an amount of delay can be tolerated, and data transmitted from the terminal device to the relay node may be associated with an indication of the data's class of delay tolerability.

The block of data and the associated indication of the time by which the data should be transmitted to the base station are schematically identified in step S2 in FIG. 3 as "data D(1)" and "timing T(1)" to indicate they relate to the first data received by the relay device since it last emptied its buffer 210c. That is to say, they are data and an associated timing received by the relay node while the relay's buffer is empty.

It will be appreciated the way in which the time by which a particular block of data should be transmitted to the base station is determined is not significant and will generally be an application-layer decision made according to the implementation at hand. For example, a smart meter terminal device may be configured to transmit routine daily usage data along with an indication that the data should be relayed onto the base station within a period of six hours, but may be operable to transmit data indicating a potential error condition has arisen with an indication that it be relayed onto the base station within a period of 15 minutes, or some other time according to the seriousness of the error.

The block of data D(1) and associated indication of timing T(1) is, as described above for this example, received by the relay device in step S2 from the relevant terminal device 206 over a Wi-Fi radio interface, such as the radio link 216 represented in FIG. 2. In this regard, the WLAN access point discovery, link setup and communication protocols underlying the transfer of the information from the terminal device to the relay device may follow previously proposed principles for WLAN communications. For example, the relevant information may be encapsulated in an IEEE 802.11 (a/b/g/n etc.) format frame (the specific encapsulation mechanism is not significant) in accordance with known techniques.

When the relay device 210 has successfully decoded the data D(1) and indication of the required transmission time T(1) received from the terminal device in step S2, the relay device transmits an acknowledgement of the safe receipt back to the terminal device 206, as schematically represented in FIG. 3 in step S3. The acknowledgment signalling between the relay device and the terminal device is again over a Wi-Fi radio interface, such as the radio link 216 represented in FIG. 2 in accordance with established WLAN communication protocols.

The transfer of data (D) and indication of time (T) by which the data should be transmitted to the base station and the associated acknowledgement signalling of steps S2 and S3 may be configured to adopt ARQ/HARQ procedures in accordance with any conventional techniques to help ensure reliable transmission of the data and timing from the terminal device to the relay device.

In step S4 the relay device 210 is configured to store the data D(1) received from the terminal device 206 in its buffer 210c in association with an identifier for the terminal device from which the data was received.

In step S5 the relay node determines a time until the block of data received in step S2 should be transmitted to the base station from the indication of a time by which the block of data should be transmitted to the base station received from the terminal device and starts a corresponding count-down timer CDT. The purpose of the countdown timer is to countdown until it reaches a trigger value at which time the relay device 204 will transmit the data in its buffer 210c to the base station 210, as discussed further below. Thus, if the indication of a time by which the block of data should be transmitted to the base station comprises an indication of an acceptable delay, the countdown timer may be set to an initial value based on the acceptable delay for data D1. On the other hand, if the indication of a time by which the block of data should be transmitted to the base station comprises an indication of an absolute time, the countdown timer may be set to an initial value based on the difference in time from when the data D(1) are received in step S2 and the indicated time by which the data should be sent to the base station. Once the countdown timer is initiated in step S5 it continues to countdown and may also be reduced in a step-like manner in response to the relay node receiving further data for transmission to the base station and which should be transmitted before the expiry of the current countdown timer, as discussed further below.

The steps S6 to S10 of the processing represented in FIG. 3 are performed in a generally repeating manner until one of the conditions in step S6 is met to cause the processing to jump out of the loop to step S11, as discussed further below.

In step S6 the relay device monitors the countdown timer to determine if the countdown timer reaches the pre-defined trigger value mentioned above without any further data being received. If it does, the processing represented in FIG. 3 jumps from step S6 to step S11 where the data in the buffer 210c is transmitted to the base station. This ensures previously received data does not remain in the buffer 210c beyond the time by which it should be transmitted to the base station. In step S6 it is also determined if the amount of data in the buffer exceeds a pre-defined threshold value (e.g. 80% of the buffer's total capacity). If it does, the buffer 210c may be treated as in effect being full, and the processing may again jump to step S11 where the data in the buffer 210c is transmitted to the base station 204. This can help reduce the likelihood of the buffer running into an overflow condition. If neither of these events occurs before more data is received from one of the terminal devices which are using the relay device to transmit their uplink data to the base station, processing proceeds to step S7, in which a further block of data is received.

Thus step S7 in FIG. 3 represents the relay device receiving another block of data from one of the terminal devices operating in the wireless telecommunications system. The block of data may again come from any of the terminal devices communicating with the base station 204 via the relay node 210 and in this example it is assumed to come from the second terminal device (UE2) 208, as schematically indicated by the signalling arrow associated with step S7 in FIG. 3. As with step S2, the exact nature of the data and why it needs to be transmitted to the base station is not significant.

Step S7 is similar to, and will be understood from, the discussion of step S2 above. However, whereas step S2 represents the first data D(1) received by the relay device while its buffer is empty, step S7 represents subsequently received data D(n). Accordingly, and as with step S2, a significant aspect of step S7 is that in addition to transmitting the block of data D(n), the terminal device 208 also transmits an indication of a latest time T(n) by which the block of data should be transmitted to the base station. This may be done in the same manner as discussed above in relation to step S2. The block of data and the associated indication of the time by which the data should be transmitted to the base station are schematically identified in step S7 in FIG. 3 as "data D(n)" and "timing T(n)" to indicate they relate to the $n^{th}$ block of data received by the relay device since it last emptied its buffer 210c (i.e. n=2 in a first iteration through step S7, n=3 in a second iteration through step S7, and so forth).

It will be again appreciated the way in which the times T(n) by which particular blocks of data D(n) should be transmitted to the base station are determined by the terminal device is not significant and will generally be an application-layer decision according to the implementation at hand.

As with the block of data D(1) and associated indication of timing T(1) received in step S2, the blocks of data D(n) and associated indications of timing T(n) received in subsequent iterations are in this example received by the relay device from the relevant terminal device over a WLAN link in accordance with known WLAN communication techniques.

When the relay device 210 has successfully decoded the data D(n) and indication of the required transmission time T(n) received from the terminal device in a current iteration of step S7, the relay device transmits an acknowledgement of the safe receipt back to the relevant terminal device, as schematically represented in FIG. 3 in step S8. Step S8 is similar, and may be performed in a corresponding manner, to step S3 discussed above.

In step S9 the relay device 210 is configured to store the data D(n) received from the terminal device in the current iteration in its buffer 210c in association with an identifier for the terminal device from which the data was received.

In step S10 the relay node determines a time until the block of data received in the current iteration of step S7 should be transmitted to the base station from the indication of a time by which the block of data should be transmitted to the base station received from the terminal device. The time until the newly-received block of data should be transmitted to the base station is then compared with the current value for the countdown timer. If the newly-received block of data D(n) should be transmitted to the base station before expiry of the countdown timer according to its current value, the countdown timer is reduced to a value based on the time by which the newly-received data should be transmitted to the base station. If, on the other hand, the newly-received data D(n) does not need to be transmitted to the base station until after the expiry of the countdown timer according to its current value, the countdown timer is allowed to continue without change. In this way, the countdown timer tracks the shortest of the times until one of the blocks of data in the buffer 210c should be transmitted to the base station.

Following step S10, processing returns to step S6. The processing from step S6 to step S10 continues to repeat until one of the two conditions discussed above in relation to step S6 is met to cause the processing to jump to step S11. It will be appreciated that while the block of data D(n) associated with step S7 in FIG. 3 is schematically shown as being received from the second terminal device 208 in FIG. 3, the data received in the subsequent iterations through step S7 may come from any of the terminal devices being supported by the relay device. That is to say, the data received in different iterations through step S7 will in the general case not all come from a single terminal device, but will come from various terminal devices according to the uplink traffic needs of the different terminal devices operating in the wireless telecommunications network and using the relay note to support their uplink communications.

Thus, if it is determined in an iteration through step S6 the buffer has in effect become full, i.e. the buffer contains an amount of data that is greater than a pre-defined threshold amount (which need not correspond with the buffer's absolute capacity to provide space for storing more data that could be received before the buffer can be emptied), processing jumps to step S11 in which the relay device transmits all the data in its buffer (i.e. data D(1) to D(n)) together to the base station (along with an indication of the identities of the terminal devices with which the respective data blocks are associated).

Likewise, if it is determined in an iteration through step S6 that the countdown timer CDT has reached its trigger value, processing jumps to step S11 in which, as noted above, the relay device transmits all the data in its buffer (i.e. data D(1) to D(n)) together to the base station (along with an indication of the identities of the terminal devices with which the respective data blocks are associated).

There are various ways in which the trigger value for the countdown timer may be determined. For example, in some situations it may simply be zero. In this case it will be accepted the data having the earliest time by which should be sent to the base station will be received at the base station slightly late by an amount corresponding to the time taken to perform step S11, i.e. by what might be referred to as the propagation delay for the data. To avoid this situation, the trigger value may be set according to the expected propagation delay. In other implementations, the trigger value may be higher still, for example to allow time for repeated attempts at successful execution of step S11 in the event of transmission failure, or to account for the possibility of delays in the relay node obtaining a grant of uplink transmission resources to transmit the data to the base station. In general, a suitable trigger value will be determined according to the implementation at hand, for example taking account of the extent to which the times by which data should be received at the base station are to be interpreted as must-meet deadlines (in which case the trigger value could be set relatively high), or deadlines that should be aimed to be met in the majority of cases (in which case the trigger value could be set relatively low). Values for the trigger value in an absolute sense will again depend on the specific implementation. For example, in situations where times until transmission (i.e. times data might typically spend in the buffer) are on the order of hours, trigger values of the order of minutes or longer may be appropriate. However, in situations where times to transmission are typically on the order of seconds, trigger values of the order of fractions of a second may be considered appropriate.

Thus, once processing jumps from step S6 to S11, the relay node retrieves the data stored in the buffer 210c and transmits it to the base station (along with an indication of the identities of the terminal devices with which the speculator blocks are associated). The plurality of blocks of data stored in the buffer are sent together in the sense of being sent around the same time, for example in a single transmission. Because the data are sent together there is a reduced signalling overhead as compared to a situation in which the data would be sent individually. This is because the relay device can transmit the data with a reduced number of transmissions, and furthermore can do this in a manner which tracks the earliest of the timings by which the respective blocks of data stored in the buffer should be transmitted to the base station, thereby reducing the risk of data becoming subject to unacceptable delays.

The base station thus receives the data from the relay device in step S11 and may process this for further handling in the wireless telecommunications system in accordance with conventional techniques, for example by taking account of the respective blocks of data and the identity of the terminal device from which they have been received. Once the base station has successfully received and decoded the data D(1) to D(n) it proceeds to transmit acknowledgement signalling back to the relay node, as schematically indicated in step S12. The manner in which the relay node and the base station communicate in step S11 and S12 may be based on conventional techniques for wireless telecommunications. For example, the relay node may request uplink resources from the base station to allow the relay node to transmit the relevant data in accordance with conventional techniques, and may receive a corresponding allocation of uplink resource and transmit the data on the allocated uplink resources in accordance with conventional techniques. Furthermore, the specific manner in which the different blocks of data are aggregated into a single transport block for transmission to the base station, and the manner in which the identities of the terminal devices for the respective blocks of data are indicated to the base station, may follow previously proposed techniques for multiplexing data from multiple users, for example as described by Teyeb, Oumer, et al. [2]. Furthermore still, the HARQ/ARQ procedures giving rise to the acknowledgement signalling of step S12 may also be based on conventional techniques.

In step S13, having received the acknowledgement of successful receipt of the data by the base station, the relay node clears its buffer (and sets the countdown timer to a null value), and, in step S14, returns to step S1. Processing may then continue as described above.

Thus, the processing described above with reference to FIG. 3 sets out an approach in which a relay node may buffer a plurality of blocks of data received from one or more terminal devices for onward transmission to a base station and transmit the data together to reduce signalling overhead, whilst at the same time ensuring that data is not retained in the buffer beyond a time by which it should be transmitted to the base station.

In summary, each block of data received from a terminal device may form one or more medium access control (MAC) protocol data units (PDUs) at the relay device. The relay device may then form a transport block (TB) by concatenating multiple MAC PDUs to fit a transport block (TB) size associated with the radio communications link between the relay node and the base station. When the transmission of data is triggered at the relay device, the TB carrying the aggregated data may transmitted to the base station.

In general, the number of blocks of data (packets) that will be aggregated for transmission together will depend on the typical delay tolerance of incoming data from the terminal devices and the size of the relay device buffer.

It will be appreciated there are various modifications of the processing described above that may be applied in different situations. For example, in some implementations it may be possible for data received from a terminal device to be classified as real-time data (i.e. in effect having a time by which it should be transmitted to the base station of as soon as possible/zero delay). A relay node operating in accordance with the principles set out above will naturally add the newly-received real-time data to the buffer and jump to step S11 in the immediately following iteration through step S6 (because the count time timer will affect have been reduced to 0).

Nonetheless, in some implementations data may be classified as non-real-time data that may be delayed at the relay node (e.g. for routine smart meter reporting) or as real-time data that should be sent to the base station immediately (e.g. relating to fire alarm reporting). In this case real-time (delay intolerant) and non-real-time (delay tolerant) traffic/data may be carried on separate data radio bearers between the relay node and base station. The type of bearer used may depend on the application or a quality of service (QoS) requirement. For example, for certain types of traffic, for example traffic from MTC devices, a new QoS Class may be defined with related QoS parameters to indicate, for example, whether data is delay tolerant (non-real time) or real time (non-delay tolerant). When real-time data arrives from a terminal device at the relay device, the relay device may immediately sets up a bearer to transmit this data to the base station, while retaining delay tolerant data that has previously been received and stored in the relay device buffer for later transmission, for example in response to one of the conditions associated with step S6 discussed above occurring and so triggering the transmission of data. In this regard, it will be recognised that in some implementations, the way in which data classified as real-time and data classified as non-real-time are handled may be different. In particular, data that is classified as real-time (and so should be transmitted onto the base station without unnecessary delay) may be carried on a different bearer from data which is classified as non-real-time (which may be buffered in the base station in the manner described above). Bearers for data from the perspective terminal devices to the relay node may be established according to the corresponding telecommunications standard. Thus, in situations in which the terminal devices transmit data to the relay node over a non-cellular communications link (e.g. Wi-Fi), the bearer setup and configuration for these links may not be under the control of the core network of the telecommunications communications system.

It will further be appreciated that there are different specific algorithmic approaches that may be used to achieve the same effects as those described above. For example, rather than compare the countdown timer with a trigger value in step S6, the same result could be achieved by instead reducing the countdown timer by an amount corresponding to what would otherwise be the trigger value whenever the countdown timer is first set in step S5 or reset in step S10, and then simply waiting until it reaches 0 to jump from step from step S6 to step S11.

It will also be appreciated that while the above-described embodiments are focused on a relay node communicating data from terminal devices to a base station, more generally the relay node may transmit the aggregated data to other kinds of network infrastructure equipment, such as another relay node in a multi-hop implementation.

Thus there has been disclosed method of operating a relay device to receive data from one or more terminal devices and relay the data to a base station in a wireless telecommunications system. The method comprising receiving a plurality of blocks of data from one or more terminal devices at different times. Each block of data is received in association with an indication of a time by which the block of data should be transmitted to the base station. The block of data are buffered at the relay node. The relay node determines the earliest time by which one of the received blocks of data should be transmitted to the base station and transmits the plurality of blocks of data to the base station together in advance of this earliest time. This can help to reduce signalling overhead associated with transmissions from the relay device to the base station whilst helping to ensure data is not delayed at the relay node for longer than is acceptable for the data.

Accordingly, delay tolerant transport blocks from multiple terminal device may be buffered and multiplexed in a relay device for improved utilisation of uplink radio resources than would be the case if the relay were to request uplink resources for relaying data received from terminal device on a per-connection basis (i.e. without multiplexing/aggregating data received at different times for transmission together in advance of the earliest time by which one of the data blocks should be transmitted to the base station as described herein).

Thus in some respects, approaches in accordance with embodiments of the disclosure may be outlined as follows:

(Step T1) Upon uplink packet arrival at a relay node from a delay tolerant terminal device, the data may be stored to the relay node buffer. The relay node may then check if the buffer was previously empty. If the buffer was empty, i.e. the packet arriving in the buffer is the first packet since last buffer flush, go to step T2, otherwise go to step T3.

(Step T2) Set counter based on the time until the data should be transmitted to the base station, since this is the first packet arriving in an empty buffer, and go to step T4.

(Step T3) If the time until the packet should be transmitted to the base station is less than a current value for the timer, set the timer to a value based on the time until the data should be transmitted to the base station, and go to step T4, otherwise keep decrementing the current value for the timer and go to step T4.

(Step T4) Check if the timer has expired i.e. the value for the timer has reached a trigger value. If the timer has expired go to step T6 otherwise go to step T5.

(Step T5) Check if the transmit buffer at the relay node is full. If the buffer operating capacity is reached, go to step T6 otherwise wait for more packets, and return to step T1 when a further packet is received, and keep decrementing timer.

(Step T6) If either the transmit buffer is full or the timer has expired, i.e. the packet with the lowest delay tolerance has waited the maximum allowed duration in the buffer, transmit the aggregated data to the base station and reset the timer to a null value (NULL).

Thus, in accordance with some of the principles described herein, user multiplexing and data aggregation by delaying the relayed terminal devices' transmissions at the relay node, taking into account delay tolerance of multiplexed Transport Blocks and buffer limitation at the relay node, can help to utilize available relay node to base station radio resources more efficiently and help avoid underutilization of scheduled resources. Furthermore, the terminal device specific delay tolerance information provided to the relay node allows buffer management that can help avoid late transmissions whilst maximising the uplink radio resource utilisation.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

1. A method of operating a relay device to receive data from one or more terminal devices and relay the data to network infrastructure equipment in a wireless telecommunications system, the method comprising: receiving a plurality of blocks of data from one or more terminal devices at different times, wherein each block of data is received in association with an indication of a time by which the block of data should be transmitted to the network infrastructure equipment; storing the plurality of blocks of data at the relay device; determining the earliest time by which one of the received blocks of data should be transmitted to the network infrastructure equipment; and transmitting the plurality of blocks of data to the network infrastructure equipment together in advance of the determined earliest time by which one of the received blocks of data should be transmitted to the network infrastructure equipment.

Paragraph 2. The method of paragraph 1, wherein the step of determining the earliest time by which one of the received blocks of data should be transmitted to the network infrastructure equipment is repeated each time a new block of data is received at the relay device from one of the terminal devices.

Paragraph 3. The method of paragraph 1 or 2, wherein the indication of a time by which a block of data should be transmitted to the network infrastructure equipment is received from a terminal device as an indication of an acceptable delay for the block of data.

Paragraph 4. The method of any one of paragraphs 1 to 3, wherein the indication of a time by which a block of data should be transmitted to the network infrastructure equipment is received from a terminal device as an indication of an absolute time by which the block of data should be transmitted to the network infrastructure equipment.

Paragraph 5. The method of any one of paragraphs 1 to 4, further comprising estimating a propagation delay corresponding to the time taken to transmit the plurality of blocks of data to the network infrastructure equipment, and wherein the plurality of blocks of data are transmitted to the network infrastructure equipment in advance of the earliest time by which one of the received blocks of data should be transmitted to the network infrastructure equipment by at least an amount corresponding to propagation delay.

Paragraph 6. The method of any one of paragraphs 1 to 5, further comprising receiving a further block of data from a terminal device in association with an indication that the further block of data should not be delayed at the relay device, and transmitting the further block of data to the network infrastructure equipment in response thereto.

Paragraph 7. The method of any one of paragraphs 1 to 6, wherein the further block of data and the plurality of blocks of data stored at the relay device are transmitted to the network infrastructure equipment at different times using different bearers.

Paragraph 8. The method of any one of paragraphs 1 to 7, further comprising determining if the amount of data in the plurality of blocks of data stored at the relay device exceeds a pre-defined threshold amount of data, and if so, transmitting the plurality of blocks of data to the network infrastructure equipment.

Paragraph 9. The method of any one of paragraphs 1 to 8, wherein the plurality of blocks of data are received from the one or more terminal devices over a radio interface operating in accordance with a first wireless communications operating standard and the plurality of blocks of data are transmitted to the network infrastructure equipment over a radio interface operating in accordance with a second wireless communications operating standard, wherein the first and second wireless communications operating standards are based on different wireless communications operating standards.

Paragraph 10. The method of paragraph 9, wherein the second wireless communications operating standard is a cellular telecommunications operating standard and the first wireless communications operating standard is a non-cellular telecommunications operating standard.

Paragraph 11. The method of paragraph 9 or 10, wherein the second wireless communications operating standard is a wireless local area network, WLAN, operating standard.

Paragraph 12. The method of any one of paragraphs 1 to 11, wherein the plurality of blocks of data are transmitted to the network infrastructure equipment over a radio interface operating in accordance with a Long Term Evolution, LTE, based operating standard.

Paragraph 13. The method of any one of paragraphs 1 to 12, wherein the relay device is another terminal device operating in the wireless telecommunications system.

Paragraph 14. The method of any one of paragraphs 1 to 13, wherein the network infrastructure equipment comprises a base station.

Paragraph 15. The method of any one of paragraphs 1 to 14, wherein the one or more terminal devices comprise machine type communications (MTC) devices.

Paragraph 16. The method of any one of paragraphs 1 to 15, wherein determining the earliest time by which one of the received blocks of data should be transmitted to the network infrastructure equipment and transmitting the plurality of blocks of data to the network infrastructure equipment comprise establishing a count-down timer and transmitting the plurality of blocks of data to the network infrastructure equipment when the count-down timer reaches a pre-defined trigger value, wherein as each block of data is received, the time until the block of data should be transmitted to the network infrastructure equipment is compared with the time until the count-down timer reaches the pre-defined trigger value, and if it is determined the block of data should be transmitted to the network infrastructure equipment before the count-down timer reaches the pre-defined trigger value, the count-down timer is re-set to a value based on the time until the block of data should be transmitted to the network infrastructure equipment.

Paragraph 17. The method of paragraph 16, wherein the count-down timer starts running from when the first of the plurality of blocks of data is received and from initial value based on the time until the first of the plurality of blocks of data that is received should be transmitted to the network infrastructure equipment.

Paragraph 18. The method of any one of paragraphs 1 to 17, further comprising the relay device transmitting acknowledgment signalling to a terminal device in response to receiving a block of data from the terminal device.

Paragraph 19. The method of any one of paragraphs 1 to 18, further comprising the relay device receiving acknowledgment signalling from the network infrastructure equipment in respect of the plurality of blocks of data transmitted by the relay device to the network infrastructure equipment.

Paragraph 20. The method of any one of paragraphs 1 to 19, further comprising, after transmitting the plurality of blocks of data to the network infrastructure equipment; the steps of: receiving a further plurality of blocks of data from one or more terminal devices at different times, wherein each further block of data is received in association with an indication of a time by which the further block of data should be transmitted to the network infrastructure equipment; storing the further plurality of blocks of data at the relay device; determining the earliest time by which one of the received further blocks of data should be transmitted to the network infrastructure equipment; and transmitting the further blocks of data to the network infrastructure equipment together in advance of the determined earliest time by which one of the received further of blocks of data should be transmitted to the network infrastructure equipment.

Paragraph 21. A relay device for receiving data from one or more terminal devices and relaying the data to network infrastructure equipment in a wireless telecommunications system, wherein the relay device comprises a controller unit, a transceiver unit and a storage unit configured to operate together to: receive a plurality of blocks of data from one or more terminal devices at different times, wherein each block of data is received in association with an indication of a time by which the block of data should be transmitted to the network infrastructure equipment; store the plurality of blocks of data in the storage unit; determine the earliest time by which one of the received blocks of data should be transmitted to the network infrastructure equipment; and transmit the plurality of blocks of data to the network infrastructure equipment together in advance of the earliest time by which one of the received blocks of data should be transmitted to the network infrastructure equipment.

Paragraph 22. Circuitry for a relay device for receiving data from one or more terminal devices and relaying the data to network infrastructure equipment in a wireless telecommunications system, wherein the circuitry comprises a controller element and a transceiver element configured to operate together to: receive a plurality of blocks of data from one or more terminal devices at different times, wherein each block of data is received in association with an indication of a time by which the block of data should be transmitted to the network infrastructure equipment; store the plurality of blocks of data in a storage unit; determine the earliest time by which one of the received blocks of data should be transmitted to the network infrastructure equipment; and transmit the plurality of blocks of data to the network infrastructure equipment together in advance of the earliest time by which one of the received blocks of data should be transmitted to the network infrastructure equipment.

Paragraph 23. A method of operating a terminal device in a wireless telecommunications system in which a relay device is used to relay data from the terminal device to network infrastructure equipment, the method comprising: generating a block of data to be transmitted to the network infrastructure equipment via the relay device; establishing an indication of a time by which the block of data should be transmitted to the network infrastructure equipment; and transmitting the block of data to the relay device in association with the indication of the time by which the block of data should be transmitted to the network infrastructure equipment.

Paragraph 24. A terminal device for use in a wireless telecommunications system in which a relay device is used to relay data from the terminal device to network infrastructure equipment, wherein the terminal device comprises a controller unit and a transceiver unit configured to operate together to: generate a block of data to be transmitted to the network infrastructure equipment via the relay device; establish an indication of a time by which the block of data should be transmitted to the network infrastructure equipment; and transmit the block of data to the relay device in association with the indication of the time by which the block of data should be transmitted to the network infrastructure equipment.

Paragraph 25. Circuitry for a terminal device for use in a wireless telecommunications system in which a relay device is used to relay data from the terminal device to network infrastructure equipment, wherein the circuitry comprises a controller element and a transceiver element configured to operate together to: generate a block of data to be transmitted to the network infrastructure equipment via the relay device; establish an indication of a time by which the block of data should be transmitted to the network infrastructure equipment; and transmit the block of data to the relay device in association with the indication of the time by which the block of data should be transmitted to the network infrastructure equipment.

REFERENCES

[1] ETSI TS 122 368 V11.6.0 (September 2012)/3GPP TS 22.368 version 11.6.0 Release 11)
[2] Teyeb, Oumer, et al. "User multiplexing in relay enhanced LTE-advanced networks." Vehicular Technology Conference (VTC 2010-Spring), 2010 IEEE 71st. IEEE, 2010.
[3] Marwat, Safdar Nawaz Khan, et al. "A Novel Machine-to-Machine Traffic Multiplexing in LTE-A System using Wireless In-band Relaying." Mobile Networks and Management. Springer International Publishing, 2013. 149-158.
[4] Holma H. and Toskala A., "LTE for UMTS OFDMA and SC-FDMA based radio access", John Wiley and Sons, 2009

What is claimed is:

1. A method of operating a relay device to receive data from one or more terminal devices and relay the data to network infrastructure equipment in a wireless telecommunications system, the method comprising:
   receiving a plurality of blocks of data from one or more terminal devices at different times, wherein each block of data is received in association with an indication of a time by which the block of data should be transmitted to the network infrastructure equipment;
   storing the plurality of blocks of data at the relay device;
   determining the earliest time by which one of the received blocks of data should be transmitted to the network infrastructure equipment; and
   transmitting the plurality of blocks of data to the network infrastructure equipment together in advance of the determined earliest time by which one of the received blocks of data should be transmitted to the network infrastructure equipment.

2. The method of claim 1, wherein the step of determining the earliest time by which one of the received blocks of data should be transmitted to the network infrastructure equipment is repeated each time a new block of data is received at the relay device from one of the terminal devices.

3. The method of claim 1, wherein the indication of a time by which a block of data should be transmitted to the network infrastructure equipment is received from a terminal device as an indication of an acceptable delay for the block of data.

4. The method of claim 1, wherein the indication of a time by which a block of data should be transmitted to the network infrastructure equipment is received from a terminal device as an indication of an absolute time by which the block of data should be transmitted to the network infrastructure equipment.

5. The method of claim 1, further comprising estimating a propagation delay corresponding to the time taken to transmit the plurality of blocks of data to the network infrastructure equipment, and wherein the plurality of blocks of data are transmitted to the network infrastructure equipment in advance of the earliest time by which one of the received blocks of data should be transmitted to the network infrastructure equipment by at least an amount corresponding to propagation delay.

6. The method of claim 1, further comprising receiving a further block of data from a terminal device in association with an indication that the further block of data should not be delayed at the relay device, and transmitting the further block of data to the network infrastructure equipment in response thereto.

7. The method of claim 6, wherein the further block of data and the plurality of blocks of data stored at the relay device are transmitted to the network infrastructure equipment at different times using different bearers.

8. The method of claim 1, further comprising determining if the amount of data in the plurality of blocks of data stored at the relay device exceeds a pre-defined threshold amount of data, and if so, transmitting the plurality of blocks of data to the network infrastructure equipment.

9. The method of claim 1, wherein the plurality of blocks of data are received from the one or more terminal devices over a radio interface operating in accordance with a first wireless communications operating standard and the plurality of blocks of data are transmitted to the network infrastructure equipment over a radio interface operating in accordance with a second wireless communications operating standard, wherein the first and second wireless communications operating standards are based on different wireless communications operating standards.

10. The method of claim 9, wherein the second wireless communications operating standard is a cellular telecommunications operating standard and the first wireless communications operating standard is a non-cellular telecommunications operating standard.

11. The method of claim 9, wherein the second wireless communications operating standard is a wireless local area network, WLAN, operating standard.

12. The method of claim 1, wherein the plurality of blocks of data are transmitted to the network infrastructure equipment over a radio interface operating in accordance with a Long Term Evolution, LTE, based operating standard.

13. The method of claim 1, wherein the relay device is another terminal device operating in the wireless telecommunications system.

14. The method of claim 1, wherein determining the earliest time by which one of the received blocks of data should be transmitted to the network infrastructure equipment and transmitting the plurality of blocks of data to the network infrastructure equipment comprise establishing a count-down timer and transmitting the plurality of blocks of data to the network infrastructure equipment when the count-down timer reaches a pre-defined trigger value, wherein as each block of data is received, the time until the block of data should be transmitted to the network infrastructure equipment is compared with the time until the count-down timer reaches the pre-defined trigger value, and if it is determined the block of data should be transmitted to the network infrastructure equipment before the count-down timer reaches the pre-defined trigger value, the count-down timer is re-set to a value based on the time until the block of data should be transmitted to the network infrastructure equipment.

15. The method of claim 14, wherein the count-down timer starts running from when the first of the plurality of blocks of data is received and from initial value based on the time until the first of the plurality of blocks of data that is received should be transmitted to the network infrastructure equipment.

16. The method of claim 1, further comprising the relay device transmitting acknowledgment signalling to a terminal device in response to receiving a block of data from the terminal device.

17. The method of claim 1, further comprising the relay device receiving acknowledgment signalling from the network infrastructure equipment in respect of the plurality of blocks of data transmitted by the relay device to the network infrastructure equipment.

18. The method of claim 1, further comprising, after transmitting the plurality of blocks of data to the network infrastructure equipment; the steps of:
receiving a further plurality of blocks of data from one or more terminal devices at different times, wherein each further block of data is received in association with an indication of a time by which the further block of data should be transmitted to the network infrastructure equipment;
storing the further plurality of blocks of data at the relay device;
determining the earliest time by which one of the received further blocks of data should be transmitted to the network infrastructure equipment; and
transmitting the further blocks of data to the network infrastructure equipment together in advance of the determined earliest time by which one of the received further of blocks of data should be transmitted to the network infrastructure equipment.

19. A relay device for receiving data from one or more terminal devices and relaying the data to network infrastructure equipment in a wireless telecommunications system, wherein the relay device comprises a controller, a transceiver and a storage configured to operate together to:
receive a plurality of blocks of data from one or more terminal devices at different times, wherein each block of data is received in association with an indication of a time by which the block of data should be transmitted to the network infrastructure equipment;
store the plurality of blocks of data in the storage;
determine the earliest time by which one of the received blocks of data should be transmitted to the network infrastructure equipment; and
transmit the plurality of blocks of data to the network infrastructure equipment together in advance of the earliest time by which one of the received blocks of data should be transmitted to the network infrastructure equipment.

20. Circuitry for a relay device for receiving data from one or more terminal devices and relaying the data to network infrastructure equipment in a wireless telecommunications system, wherein the circuitry comprises a controller and a transceiver configured to operate together to:
receive a plurality of blocks of data from one or more terminal devices at different times, wherein each block of data is received in association with an indication of a time by which the block of data should be transmitted to the network infrastructure equipment;

store the plurality of blocks of data in a storage;
determine the earliest time by which one of the received blocks of data should be transmitted to the network infrastructure equipment; and
transmit the plurality of blocks of data to the network infrastructure equipment together in advance of the earliest time by which one of the received blocks of data should be transmitted to the network infrastructure equipment.

21. A method of operating a terminal device in a wireless telecommunications system in which a relay device is used to relay data from the terminal device to network infrastructure equipment, the method comprising:
generating a block of data to be transmitted to the network infrastructure equipment via the relay device;
establishing an indication of a time by which the block of data should be transmitted from the relay device to the network infrastructure equipment; and
transmitting the block of data to the relay device in association with the indication of the time by which the block of data should be transmitted from the relay device to the network infrastructure equipment.

* * * * *